Patented Mar. 22, 1932

1,850,547

UNITED STATES PATENT OFFICE

WINFRID HENTRICH, OF WIESDORF-ON-THE-RHINE, JOSEF HILGER, OF COLOGNE-MULHEIM, AND RICHARD STROEBEL, OF OPLADEN, GERMANY, ASSIGNORS TO GENERAL ANILINE WORKS INC., OF NEW YORK, N. Y., A CORPORATION OF DELAWARE

PROCESS OF PREPARING AZODYESTUFFS

No Drawing. Application filed June 6, 1929, Serial No. 369,002, and in Germany June 18, 1928.

The present invention relates to a process of preparing dis- and polyazodyestuffs and to the new products obtainable thereby, more particularly it relates to azodyestuffs of the general formula:

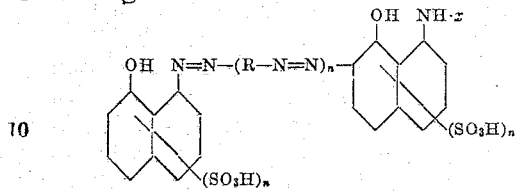

wherein R stands for the residue of one of the customary coupling components of the benzene and napthalene series, containing an amino group, such as 3-amino-4-cresolmethylether, amino-hydroquinone-dimethylether, meta-toluidine, alpha-naphthylamine and the like, $x$ stands for an acyl group which may be substituted, for example for an acetyl- or benzoyl-group, or for a heterocyclic residue attached to the nitrogen by a carbon atom, for example a quinazoline-, pyrimidine-, 1.3.3-triazine- or benzothiazol residue, and $n$ stands for one of the numbers one and two.

On attempting to build up dis- and polyazo dyestuffs of the above identified general formula from diazotized amino-mono or diazo compounds, containing as starting component a 1-amino-8-hydroxynaphthalene sulfonic acid, it has been found that the coupling with 1-(N-acyl)-amino-8-hydroxynaphthalene sulfonic acid or also in N-heterocyclic substituted 1-amino-8-hydroxy-naphthalene sulfonic acid in alkaline sodium carbonate or ammonia solution only incompletely occurs. Moreover, the disazo compounds are largely decomposed.

In accordance with the present invention, the dis- and polyazodyestuffs of the type mentioned can be obtained in satisfactory yield and excellent purity. The process of manufacture of this invention comprises carrying out the coupling of a further diazotized amino-mono- or disazo compound obtainable in the usual manner from a diazotized 1-amino-8-hydroxy-naphthalene sulfonic acid and any desired intermediate component or components of the benzene or naphthalene series containing diazotizable amino groups with a 1-(N-acyl)-amino-8-hydroxynaphthalene sulfonic acid or with a N-heterocyclic substituted 1-amino-8-hydroxynaphthalene sulfonic acid in the presence of pyridine.

Instead of pyridine a homologue thereof, such as a methyl pyridine or quinoline can be used, these homologues being equivalents of pyridine in our process. The quantity of the pyridine used may be varied within the widest limits, but generally we take care that about at least 5% by weight (calculated on the quantity of the coupling mixture) are present; generally we couple in an aqueous medium containing about 5 to about 30% by weight of pyridine.

Thus we obtain a valuable type of dyestuff hitherto obtainable only with great difficulty. The products dye the vegetable fiber surprisingly well, yielding blue, grey, bluish-grey or green shades of excellent fastness properties. Moreover, when the acyl or heterocyclic residue of the 1-amino-8-hydroxy-naphthalene used as end component contains a diazotizable amino group, this amino group can be further modified, for example, by treatment with acid chlorides or anhydrides (such as phosgene, thiophosgene, acetic anhydride, benzoyl or nitrobenzoyl chloride and the like) or by treatment with heterocyclic compounds containing mobile halogen atoms, such as chloro quinazolines, chloro phthalazines, chloro pyrimidines, cyanuric chloride and the like or by further diazotization and coupling in substance or on the fiber.

The invention is illustrated by the following examples, without being restricted thereby:

*Example 1.*—482 parts by weight of the dyestuff obtained by known processes from diazotized 1-amino-8-hydroxynaphthalene-3.6-disulfonic acid and 3-amino-4-cresolmethylether are diazotized in the customary manner. The diazo compound made into a paste with ice is caused to run below the surface and with vigorous stirring into a solution of 345 parts by weight of 1-(4'-methoxy-benzoyl)-amino-8-hydroxynaphthalene-6-sulfonic acid in 5000 parts of water and 1100 parts by volume of pyridine. Coupling occurs immediately yielding a blue dyestuff, which is worked up in the customary manner. The dyestuff has in the free state the following formula:

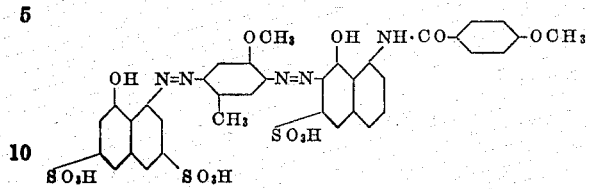

It dyes cotton greyish blue shades of very satisfactory fastness to light and knitted viscose dark blue shades of excellent fastness properties and evenness.

On replacing in the above example the 1-amino-8-hydroxynaphthalene-3.6-disulfonic acid by the 1-amino-8-hydroxy-naphthalene-4.7-disulfonic acid and using as end component the 1-acetylamino-8-hydroxy-naphthalene-6-sulfonic acid a fast bluish-grey dyestuff is obtained. Moreover, 1-amino-8-hydroxynaphthalene-4.6-disulfonic acid can be used as starting components with a similar result. The 3-amino-4-cresol-methylether can, for example, be replaced by amino-hydroquinone-dimethylether, meta-toluidine, α-naphthylamine and similar compounds and finally there can be used as end component the 1-benzoylamino-8-hydroxy-naphthalene-4-sulfonic acid or the condensation product from 4-chloro-quinazoline and 1-amino-8-hydroxy-naphthalene-6-sulfonic acid, whereby greenish-grey dyestuffs are obtained or a condensation product obtainable from 1 mol 2.4-dichloro-quinazoline or a similar heterocyclic compound with two replaceable halogen atoms, 1 mol 1-amino-8-hydroxy-3.6-disulfonic acid and 1 mol aniline or another aromatic amine, or also the condensation product containing the 1.3.5-triazine ring, in which at least one peri aminonaphthol sulfonic acid is combined by means of the nitrogen atom thereof with the triazine ring. These condensation products can moreover be further substituted by any desired other atoms or groups, also by such groups as contain the azo bridge —(N=N—), such as the 4-amino-4'-hydroxy-azo-benzene-3'-carboxylic acid.

*Example 2.*—The diazo compound obtained from 482 parts by weight of the azo dyestuff from diazotized 1-amino-8-hydroxy-naphthalene-3.6-disulfonic acid and 3-amino-4-cresolmethylether is combined according to the process of Example 1 with a solution of 330 parts by weight of 1-(4'-aminobenzoyl)-amino-8-hydroxynaphthalene-6-sulfonic acid in water and pyridine. The resulting dyestuff having in the free state the following formula:

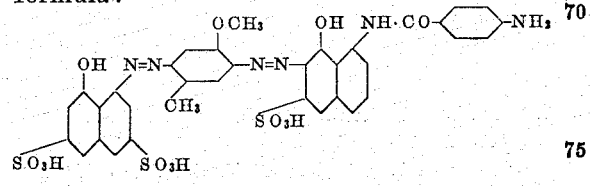

dyes cotton powerful blue shades and yields after diazotization on the fiber and development with 1-phenyl-3-methyl-5-pyrazolone a full green of great clarity and which is distinguished by remarkable fastness to washing, light and over-dyeing; it can be discharged with ease.

Furthermore, by using as diazo component the combination 1.8-aminonaphthol-3.6-disulfonic acid + 3-amino-4-cresolmethylether + 1-aminonaphthalene-6-sulfonic acid and combining the diazo compound thereof with 1-(3'-amino-4'-methoxybenzoyl)-amino-8-hydroxy-naphthalene-6-sulfonic acid in an aqueous medium in the presence of pyridine, a dyestuff is obtained, which dyes cotton blue, the dyeing on being diazotized and developed on the fiber yields a green, even somewhat more fast to light and of satisfactory fastness to washing.

Instead of the above end component any N-heterocyclic substituted peri-amino-naphthol sulfonic acid containing diazotizable amino groups can be used.

Thus, dyestuffs, still somewhat more fast to over-dyeing are obtained by using as coupling components reduced condensation products from Bz-nitro-chloro-quinazoline and peri-amino-naphthol sulfonic acids.

*Example 3.*—The diazo compound from 482 parts by weight of the azo dyestuff obtained from diazotized 1-amino-8-hydroxy-naphthalene-3.6-disulfonic acid and 3-amino-4-cresol-methylether is coupled with a solution of 372 parts by weight of 1-(4'-acetylaminobenzoyl)-amino-8-hydroxynaphthalene-6-sulfonic acid in water and pyridine. A deep blue coloration is immediately produced. The dyestuff is worked up in the customary manner and dyes cotton fast blue shades. It has in the free state the following formula:

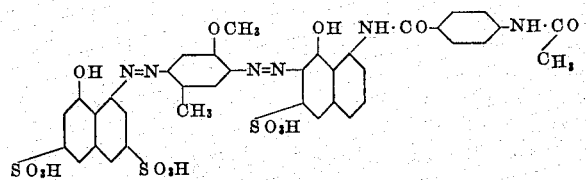

3-acetylamino-phenyl-1.2-naphthimidazole-8-hydroxy-3.6-disulfonic acid can be used as end component. Moreover, on coupling the said diazoazo compounds with 1-(3'-aminobenzoyl) - amino- 8 -hydroxynaphthalene-6-sulfonic acid and treating the resulting dyestuff with phosgene in alkaline sodium carbonate solution a blue dyestuff is obtained, which dyes cotton fast shades. A similar dyestuff is obtained from the azo dyestuff produced from 1.8-aminonaphthol-3.6-disulfonic acid + 3-amino-4-cresol-methylether + (pyridine coupling) 1-(4'-aminobenzoyl)-amino-8-hydroxylnaphthalene-4.6-disulfonic acid by decomposition with 4-chloroquinazoline in an aqueous medium at 40–50° C. in the presence of sodium carbonate or sodium acetate.

*Example 4.*—964 parts by weight of the azo dyestuff from diazotized 1-amino-8-hydroxynaphthalene-3.6-disulfonic acid and 3-amino-4-cresolmethylether are diazotized. The diazo compound is stirred into a solution of 678 parts by weight of the condensation products from two mols of 1-amino-8-hydroxy-naphthalene-6-sulfonic acid and terephthaloyl chloride in 5000 parts of water and 1100 parts by weight of pyridine. The formation of the dyestuff proceeds at once accompanied by a bluish green coloration. The dyestuff is salted out and worked up in the customary manner. The dyestuff obtained has in the free state the following formula:

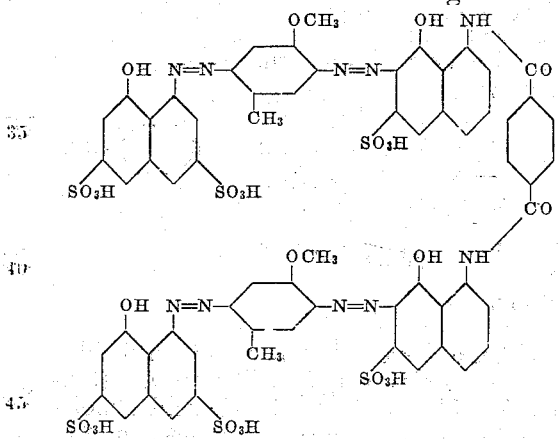

It dyes cotton beautiful greyish-blue shades of excellent fastness to light. Instead of the condensation product from two mols of 1-amino - 8 - hydroxynaphthalene - 6 - sulfonic acid and terephthaloyl chloride condensation products from two or three similar or dissimilar peri-aminonaphthol sulfonic acids and heterocyclic compounds containing two or three successively replaceable halogen atoms, can also be used with similar results; these products can be coupled with two or three mols of diazo- or diazo-azo-compounds at least one of which belongs to the type peri aminonaphthol sulfonic acid + middle component.

Furthermore, in the heterocyclic compounds mentioned for use as coupling components the peri aminonaphthol sulfonic acids, except one, can be replaced by any other desired radicals, which are combined with the heterocyclic rings by means of nitrogen, oxygen or sulfur atoms. Thus, for example, a dyestuff dyeing viscose of different origin evenly blue is obtained in very good yield and with a smooth reaction by further diazotizing the aminoazo compounds obtainable from 1-amino-8-hydroxynaphthalene-3.6-disulfonic acid and 3-amino-4-cresol-methylether and coupling in accordance with the above directions in the presence of pyridine with the condensation product from 1 mol of 4.7-dichloro-quinazoline, 1 mol of 1-amino - 8 - hydroxynaphthalene - 3.6-disulfonic acid and 1 mol of cyclohexyl-amine.

We claim:

1. In the process of preparing dis- and polyazo dyestuffs the step which comprises coupling a diazo compound of the general formula:

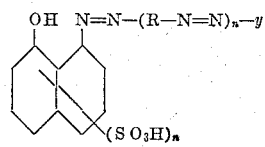

wherein R stands for a residue of a coupling component of the benzene and naphthalene series, $y$ stands for an acid radical and $n$ stands for one of the numbers one and two, with a coupling component of the general formula:

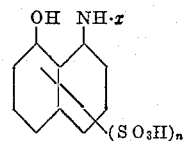

wherein $x$ stands for a substituent of the group consisting of acyl groups and heterocyclic residues attached to the nitrogen atom by a carbon atom, $n$ stands for one of the numbers one and two, in the presence of pyridine.

2. In the process of preparing dis- and polyazo dyestuffs the step which comprises coupling a diazo compound of the general formula:

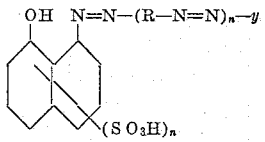

wherein R stands for a residue of a coupling component of the benzene and naphthalene series, $y$ stands for an acid radical and $n$ stands for one of the numbers one and two, with a coupling component of the general formula:

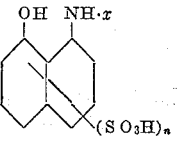

wherein $x$ stands for a substituent of the group consisting of acyl groups and heterocyclic residues attached to the nitrogen atom by a carbon atom, $n$ stands for one of the numbers one and two, in an aqueous medium containing at least about 5% by weight of pyridine.

3. In the process of preparing dis- and polyazo dyestuffs the step which comprises coupling a diazo compound of the general formula:

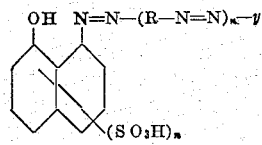

wherein R stands for a residue of a coupling component of the benzene and naphthalene series, $y$ stands for an acid radical and $n$ stands for one of the numbers one and two, with a coupling component of the general formula:

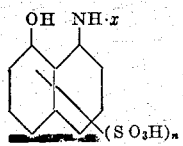

wherein $x$ stands for a substituent of the group consisting of acyl groups and heterocyclic residues attached to the nitrogen atom by a carbon atom, $n$ stands for one of the numbers one and two, in an aqueous medium containing a least about 5–20% by weight of pyridine.

4. In the process of preparing disazo dyestuffs the step which comprises coupling the diazotized monoazodyestuff from diazotized 1-amino-8-hydroxy naphthalene - 3.6 - disulfonic acid and 3-amino-4-cresol methylether with a molecular proportion of 1-(4'-aminobenzoyl-)-amino-8-hydroxy naphthalene-6-sulfonic acid in aqueous pyridine.

5. As new products dis- and polyazo-dyestuffs of the probable general formula:

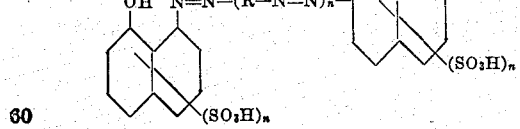

wherein R stands for the residue of a coupling component of the benzene and naphthalene series, $ac$ stands for an acyl group and $n$ stands for one of the numbers one and two, dyeing the vegetable fiber blue, grey, bluish-grey or -green shades of excellent fastness properties and yielding upon reduction with stannous chloride and hydrochloric acid one molecule of a peri-amino-naphtholsulfonic acid, one molecule of a 1-acylamino-7-amino-8-hydroxy naphthalene sulfonic acid and 1 or 2 molecules of an aromatic diamine.

6. As new products dis- and polyazo-dyestuffs of the probable general formula:

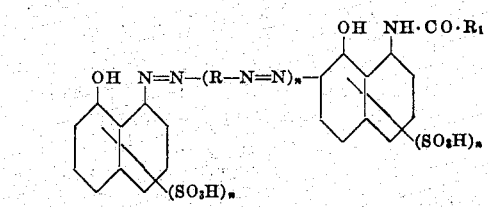

wherein R stands for the residue of a coupling component of the benzene and naphthalene series, $R_1$ stands for a radical of the benzene series and $n$ stands for one of the numbers one and two, dyeing the vegetable fiber blue, grey, bluish-grey or -green shades of excellent fastness properties and yielding upon reduction with stannous chloride and hydrochloric acid one molecule of a peri-amino-naphtholsulfonic acid, one molecule of an 1-benzoylamino-7-amino-8-hydroxy naphthalene sulfonic acid and 1 or 2 molecules of an aromatic diamine.

7. As a new product the dyestuff of the formula:

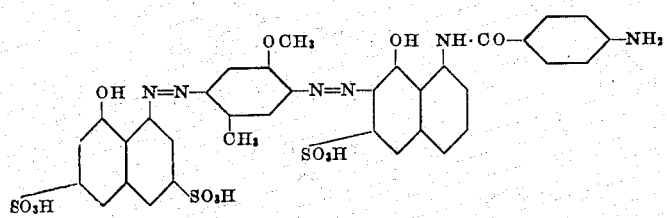

dyeing the vegetable fiber powerful blue shades and yielding upon reduction with stannous chloride and hydrochloric acid 1 molecule of 1-amino-8-hydroxy naphthalene-3.6-disulfonic acid, 1 molecule of 1.4-diamino-2-methyl-5-methoxybenzene and 1 molecule of 1-(4'-amino-benzoyl)-amino-7-amino-8-hydroxynaphthalene-6-sulfonic acid.

In testimony whereof we have hereunto set our hands.

WINFRID HENTRICH. [L. S.]
JOSEF HILGER. [L. S.]
RICHARD STROEBEL. [L. S.]